US009565168B1

(12) United States Patent
Marquardt et al.

(10) Patent No.: US 9,565,168 B1
(45) Date of Patent: Feb. 7, 2017

(54) SYSTEM AND METHOD OF A TRUSTED COMPUTING OPERATION MODE

(71) Applicant: Sprint Communications Company L.P., Overland Park, KS (US)

(72) Inventors: Ronald R. Marquardt, Woodinville, WA (US); Lyle W. Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/703,885

(22) Filed: May 5, 2015

(51) Int. Cl.
*H04L 29/06* (2006.01)
*H04L 12/26* (2006.01)
*H04L 29/08* (2006.01)

(52) U.S. Cl.
CPC ........... *H04L 63/04* (2013.01); *H04L 43/0811* (2013.01); *H04L 67/14* (2013.01)

(58) Field of Classification Search
CPC ....... H04L 63/04; H04L 67/14; H04L 43/0811
USPC . 726/3, 1, 12, 9, 22, 5, 6, 7, 8, 29; 713/171, 156, 151, 152, 160, 166, 182; 380/270, 255
See application file for complete search history.

(56) References Cited

U.S. PATENT DOCUMENTS

| | | | | |
|---|---|---|---|---|
| 5,928,363 A * | 7/1999 | Ruvolo | ................... | G06F 21/31 713/155 |
| 5,983,350 A * | 11/1999 | Minear | ............... | H04L 63/0227 709/225 |
| 6,775,772 B1 * | 8/2004 | Binding | .............. | H04L 63/0428 380/279 |
| 7,305,712 B2 * | 12/2007 | Watt | ..................... | G06F 9/30123 712/244 |
| 7,325,083 B2 * | 1/2008 | Watt | ..................... | G06F 9/4812 710/261 |
| 7,340,573 B2 * | 3/2008 | Watt | ..................... | G06F 12/1491 711/145 |

(Continued)

FOREIGN PATENT DOCUMENTS

WO    WO2015039699 A1    3/2015

OTHER PUBLICATIONS

Network Functions Virtualisation, "An Introudction, Benefits, Enablers, Challenges & Call for Action," Oct. 22-24, 2012, "SDN an OpenFlow World Congress," Darmstadt-Germany.

(Continued)

*Primary Examiner* — David García Cervetti

(57) ABSTRACT

A security monitor processing server is disclosed. The server comprises a plurality of processors, a memory, and a security monitor application that, when executed by a first processor checks for a message that requests establishment of a secure communication link between a different server and the server directed to it by the different server. The application sends a request to an operating system (OS) to suspend functionality of the other processors except for the first processor. The application sends a request to the OS to suspend a process executing on the first processor. The application conducts a communication session with the different server. The application, responsive to completion of the communication session sends a request to the OS to allow the other processors to resume functionality. The application sends a request to the OS to resume execution of the suspended process on the first processor.

20 Claims, 6 Drawing Sheets

(56) References Cited

U.S. PATENT DOCUMENTS

| | | | | |
|---|---|---|---|---|
| 7,370,210 | B2* | 5/2008 | Symes | G06F 9/4812 380/229 |
| 7,661,104 | B2* | 2/2010 | Watt | G06F 9/4812 713/166 |
| 7,849,296 | B2* | 12/2010 | Watt | G06F 9/30076 712/227 |
| 8,090,797 | B2* | 1/2012 | Chinta | G06F 21/53 709/203 |
| 8,171,483 | B2* | 5/2012 | Nord | G06F 9/5077 717/120 |
| 8,271,976 | B2* | 9/2012 | Vega | G06F 9/45533 718/1 |
| 8,280,944 | B2* | 10/2012 | Laadan | G06F 11/1438 709/201 |
| 8,443,230 | B1* | 5/2013 | James-Roxby | G06F 11/1641 714/11 |
| 8,712,407 | B1 | 4/2014 | Cope et al. | |
| 8,797,875 | B2 | 8/2014 | Garcia Martin et al. | |
| 9,161,227 | B1 | 10/2015 | Bye et al. | |
| 9,183,606 | B1* | 11/2015 | Paczkowski | G06T 1/20 |
| 9,191,865 | B1* | 11/2015 | Paczkowski | H04W 76/02 |
| 9,230,085 | B1* | 1/2016 | Paczkowski | G06F 21/57 |
| 9,282,898 | B2 | 3/2016 | McRoberts | |
| 9,324,016 | B1* | 4/2016 | Cordes | G06K 19/0727 |
| 9,392,446 | B1* | 7/2016 | Paczkowski | H04W 12/04 |
| 2002/0107958 | A1* | 8/2002 | Faraldo, II | H04L 12/24 709/224 |
| 2003/0177387 | A1* | 9/2003 | Osterwalder | H04L 63/0209 726/12 |
| 2004/0139352 | A1* | 7/2004 | Shewchuk | H04L 63/20 726/9 |
| 2004/0177269 | A1* | 9/2004 | Belnet | G06F 12/1491 726/27 |
| 2004/0181682 | A1* | 9/2004 | Orino | G06F 21/71 726/22 |
| 2004/0187117 | A1* | 9/2004 | Orion | G06F 9/4812 718/100 |
| 2004/0260910 | A1* | 12/2004 | Watt | G06F 9/30076 712/43 |
| 2005/0102603 | A1* | 5/2005 | Tapper | G06F 11/2094 714/770 |
| 2005/0114616 | A1* | 5/2005 | Tune | G06F 12/1441 711/163 |
| 2005/0138421 | A1* | 6/2005 | Fedronic | G06F 21/32 726/4 |
| 2005/0160210 | A1* | 7/2005 | Watt | G06F 9/4812 710/269 |
| 2006/0146767 | A1* | 7/2006 | Moganti | H04L 67/30 370/338 |
| 2006/0190614 | A1* | 8/2006 | Altman | G06F 9/4862 709/230 |
| 2008/0020745 | A1 | 1/2008 | Bae et al. | |
| 2008/0162877 | A1* | 7/2008 | Altman | H04L 67/10 712/34 |
| 2008/0165259 | A1* | 7/2008 | Nobels | H04N 1/00127 348/231.2 |
| 2009/0007100 | A1* | 1/2009 | Field | G06F 21/53 718/1 |
| 2009/0199177 | A1* | 8/2009 | Edwards | G06F 9/5077 718/1 |
| 2009/0241108 | A1* | 9/2009 | Edwards | G06F 21/604 718/1 |
| 2009/0300605 | A1* | 12/2009 | Edwards | G06F 9/5077 718/1 |
| 2009/0320048 | A1* | 12/2009 | Watt | G06F 9/4812 719/319 |
| 2010/0192230 | A1* | 7/2010 | Steeves | H04L 63/08 726/26 |
| 2011/0119748 | A1* | 5/2011 | Edwards | G06F 9/5077 726/12 |
| 2011/0173443 | A1* | 7/2011 | Osterwalder | H04L 63/0815 713/165 |
| 2012/0040662 | A1 | 2/2012 | Rahman et al. | |
| 2012/0331550 | A1 | 12/2012 | Raj et al. | |
| 2013/0055256 | A1 | 2/2013 | Banga et al. | |
| 2013/0091568 | A1 | 4/2013 | Sharif et al. | |
| 2013/0305333 | A1* | 11/2013 | Katzer | G06F 21/6245 726/7 |
| 2013/0345530 | A1* | 12/2013 | McRoberts | A61B 5/0022 600/323 |
| 2014/0013327 | A1 | 1/2014 | Sherwood et al. | |
| 2014/0033316 | A1* | 1/2014 | Paczkowski | G06F 21/74 726/26 |
| 2014/0047548 | A1* | 2/2014 | Bye | G06F 21/74 726/26 |
| 2014/0052922 | A1* | 2/2014 | Moyer | G06F 12/0864 711/128 |
| 2014/0053003 | A1* | 2/2014 | Moyer | G06F 21/558 713/300 |
| 2014/0201374 | A1 | 7/2014 | Ashwood-Smith et al. | |
| 2014/0241247 | A1 | 8/2014 | Kempf et al. | |
| 2014/0281544 | A1* | 9/2014 | Paczkowski | G06Q 10/00 713/171 |
| 2014/0298477 | A1* | 10/2014 | Castro | G06F 21/606 726/26 |
| 2014/0304803 | A1 | 10/2014 | Pope et al. | |
| 2014/0344912 | A1* | 11/2014 | Chapman, II | H04L 63/1441 726/11 |
| 2015/0046676 | A1* | 2/2015 | Archibald | G06F 9/5083 712/28 |
| 2015/0089246 | A1* | 3/2015 | Kanai | G06F 12/1491 713/193 |
| 2015/0117409 | A1 | 4/2015 | Ghai | |
| 2015/0117455 | A1 | 4/2015 | Umesh et al. | |
| 2015/0370704 | A1* | 12/2015 | Kato | G06F 12/0638 713/193 |
| 2015/0373050 | A1 | 12/2015 | Dayan et al. | |
| 2016/0157084 | A1 | 6/2016 | Tsubouchi | |

OTHER PUBLICATIONS

Network Functions Virtualisation, "Network Operator Perspectives on Industry Progress," Oct. 14-17, 2012, "SDN an OpenFlow World Congress," Darmstadt-Germany.

Paczkowski, Lyle W., et al., "Trusted Signaling in 3GPP Interfaces in a Network Function Virtualization Wireless communication System," filed Jun. 22, 2015, U.S. Appl. No. 14/746,615.

Marquardt, Ronald R., et al., "System and Method of Establishing Trusted Operability Between Networks in a Network Functions Virtualization Environment," filed Sep. 8, 2015, U.S. Appl. No. 14/847,992.

Marquardt, Ronald R., et al., "Dynamic Addition of Network Function Services," filed Nov. 2, 2015, U.S. Appl. No. 14/930,146.

Marquardt, Ronald R., et al., "Support Systems Interactions with Virtual Network Functions in a Trusted Security Zone," filed Oct. 9, 2015, U.S. Appl. No. 14/879,324.

Marquardt, Ronald R., et al., "Securing Communication in a Network Function Virtualization (NFV) Core Network," filed Oct. 1, 2015, U.S. Appl. No. 14/872,936.

Marquardt, Ronald R., et al., "System and Method for Trusted Operability When Moving Between Network Functions Virtualization States," filed Oct. 9, 2015, U.S. Appl. No. 14/879,327.

Ray, Amar N., et al., "IPv6 to IPv4 Data Packet Migration in a Trusted Security Zone," filed Jul. 7, 2015, U.S. Appl. No. 14/793,344.

Notice of Allowance dated Oct. 5, 2016, U.S. Appl. No. 14/746,615, filed Jun. 22, 2015.

Foreign Communication from a Related Counterpart—International Search Report and Written Opinion dated Oct. 21, 2016, filed on Aug. 11, 2016, International Application No. PCT/US2016/046648.

Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.

(56) References Cited

OTHER PUBLICATIONS

Marquardt, Ronald R., et al., "System and Method for Trusted Operability When Moving Between Network Functions Virtualization States," filed on Aug. 11, 2016, International Application No. PCT/US2016/046648.
Bales, Mark R., et al., "Session Aggregator Brokering of Data Stream Communication," filed Oct. 3, 2016, U.S. Appl. No. 15/284,506.

* cited by examiner

SYSTEM AND METHOD OF A TRUSTED COMPUTING OPERATION MODE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some servers may utilize hardware assisted trust, and some servers may not utilize hardware assisted trust. Servers that utilize hardware assisted trust may not be able to communicate with servers that do not utilize hardware assisted trust. Trusted servers may not be able to communicate with servers without trust because the trusted servers have technology that prevents the trusted servers from communicating with the non-trusted servers. The non-trusted servers may not be able to communicate with the trusted servers due to a lack of hardware support for trusted operations that allows the trusted servers to communicate in trust.

SUMMARY

In an embodiment, a security monitor processing server is disclosed. The server comprises a plurality of processors, a memory and a security monitor application stored to the memory. The security monitor application when executed by a first processor of the plurality of processors checks for a message from a different server that requests establishment of a secure communication link between the different server and the security monitor application. The application, responsive to finding the message, sends a request to an operating system on the security monitor processing server to suspend functionality of the other processors of the plurality of processors except for the first processor. The application, responsive to finding the message, sends a request to the operating system to suspend a process executing on the first processor. The application conducts a communication session with the different server. The application, responsive to completion of the communication session, sends a request to the operating system to allow the other processors to resume functionality. The application, responsive to completion of the communication session, sends a request to the operating system to resume execution of the suspended process on the first processor.

In an embodiment, a method of establishing hardware assisted trust to a communication server that does not utilize hardware assisted trust is disclosed. The method comprises a secure application of a security monitor server checking for a message that requests for establishment of a secure communication link between the first security monitor server and a different server, wherein the application is executed on a first processor of a plurality of processors, wherein the message is directed to the secure application from the different server. The method further comprises the application, responsive to finding the message, sending a request to an operating system to suspend the other processors of the plurality of processors except for the first processor. The method further comprises the application, responsive to finding the message, sending a request to the operating system to suspend a process executing on the first processor. The method further comprises the application conducting a communication session with the different server. The method further comprises the application, responsive to completing the communication session, sending a request to the operating system to release the other processors to resume functionality. The method further comprises the application, responsive to completing the communication session, sending a request to the operating system to resume execution of the suspended process on the first processor.

In an embodiment, a method of establishing hardware assisted trust to a communication server that does not utilize hardware assisted trust is disclosed. The method comprises a security monitor application of a first server checking for a message from a second server that requests establishment of a secure communication link between the first server and the second server, wherein the security monitor application is executed on a first processor of a plurality of processors, wherein the message is directed to a secure application that also executes on the first processors, wherein the message is from the second server. The method further comprises the security monitor application, responsive to finding the message, sending a request to an operating system to suspend the other processors among the plurality of processors except for the first processor, wherein the security monitor application receives the message and a security token from the second server, wherein the security token identifies the second server as a secure server. The method further comprises the security monitor application, responsive to finding the message, sending a request to the operating system to suspend a process executing on the first processor. The method further comprises the security monitor application invoking a secure application that executes on the first processor, wherein the security monitor application sends a request to the operating system to invoke the secure application. The method further comprises the security monitor application sending the message to the secure application, wherein the secure application engages in a communication session with the second server when trust has been established between the security monitor application and the second server. The method further comprises the security monitor application receiving a message from the secure application, wherein the secure application sends a message to the security monitor application when it has finished the communication session with the second server. The method further comprises the security monitor application stopping the secure application, wherein the security monitor application sends a request to the operating system to stop the secure application, wherein the secure application does not work until it is re-invoked. The method further comprises the security monitor application sending a request to the operating system to release the other processors from their suspended state and resume functionality. The method further comprises the security monitor application sending a request to the operating system to resume execution of the suspended process on the first processor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1A:
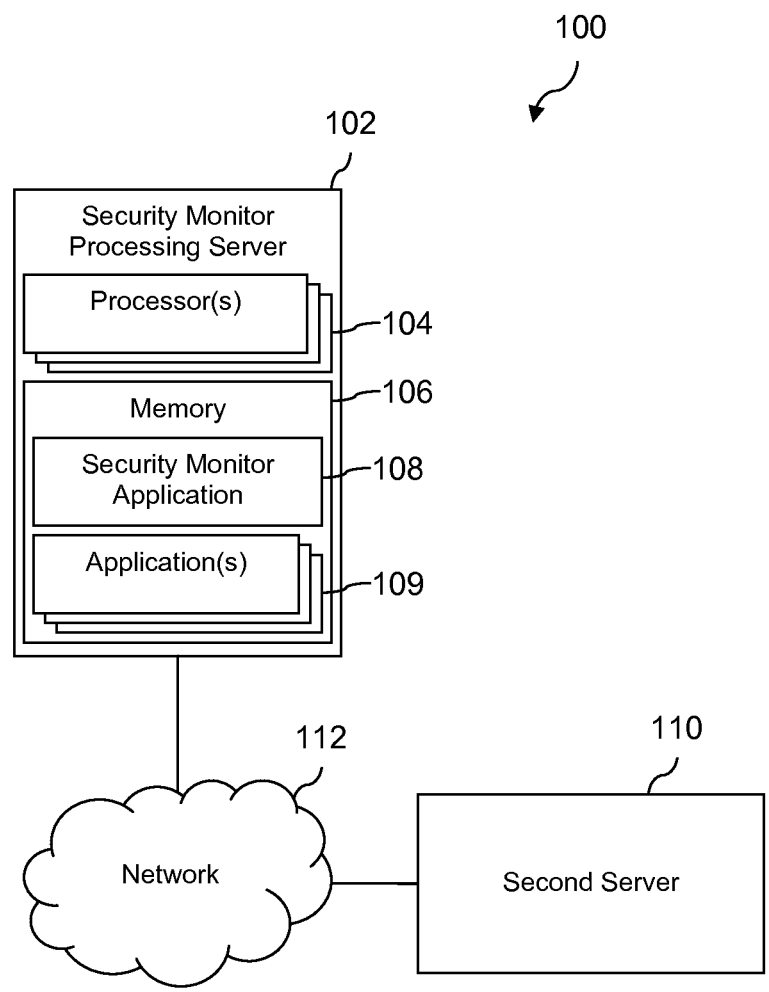
- FIG. 1A is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods for secure operation between servers that either utilize hardware assisted trust or do not utilize hardware assisted trust. Prior to implementation of a security monitor application that is described herein, servers were unable to conduct trusted operations with servers that do not utilize hardware assisted trust.

The security monitor application is able to set up a trusted environment for communication between the security monitor processing server that does not utilize hardware assisted trust and another server that does utilize hardware assisted trust. By setting up a trusted environment to communicate and/or process instructions such as writing data, editing data, performing transactions, performing service requests, and other instructions in, the security monitor application enables the security monitor processing server to communicate with other servers that utilizes hardware assisted trust. This benefits companies that use servers that do not utilize hardware assisted trust so that they do not have to purchase or acquire new servers that do utilize hardware assisted trust in order to interwork with servers executing in trust.

For example, an application on a server, A, performs a trusted block of code. Server A executes that trusted block of code using hardware assisted trust and/or in a trusted execution environment as discussed more fully hereinafter. The trusted block of code requests an operation to be performed on its behalf by an application on a server, B. Sever B, however, does not have hardware support for trusted execution. Those skilled in the art may use the present disclosure to achieve many of the purposes or requirements of trusted execution in hardware assisted trust, but instead of having hardware assisted trust, utilizing a software application, in this case, the security monitor application, and operating system support on the server B to assure that no other processors or processes can be executing when the security monitory application (possibly aided by a secure application launched by the security monitor application) and the operating system are performing the operation requested to be done with trust.

In an embodiment, a security monitor processing server comprises the security monitor application. The security monitor application may be implemented to facilitate communication between the security monitor processing server that does not utilize hardware assisted trust and other servers that do utilize hardware assisted trust. The security monitor application checks for a message directed to the security monitor application from a different server, where the message requests the establishment of a secure communication link between the different server and the security monitor processing server. When the security monitor application finds the message that has been sent to it, the security monitor application sends a request to an operating system of the security monitor processing server to suspend functionality of a plurality of processors of the server except for a first processor that the security monitor application executes on. The security monitor application also sends a request to the operating system to suspend other processes that may be executing on the first processor. In an embodiment, the security monitor processing server may be described as semi-secure because initially, the security monitor processing server is inherently non-trusted; this remains the case until the security monitor application initiates suspension of other processors of the plurality of processors of the security monitor processing server and the other processes executing on the processor that the security monitor application is executing on.

The different server sends a security token or another form of validation for the security monitor application to use to establish that the different server is a secure server that the security monitor processing server may communicate with in trust once trust has been established by the security monitor application. Once trust has been established by the security monitor application, the application conducts a communication session with the different server. During the communication session, information is exchanged, in trust, between the security monitor application and the different server.

In an embodiment, there may be a conflict of security when the security monitor processing server requests the suspension of the other processors and processes occurring on the security monitor processing server. The conflict may arise from how the security monitor processing application is able to be made aware of or able to validate that the process of suspending the other processors and processes on the active processor has occurred. There may be several ways the security monitor application may accomplish this. One implementation may involve the security monitor application delaying itself from taking action for a pre-defined period of time so that the operating system may have time to suspend the other processors and the processes that are occurring on the active processor. Another implementation may involve the security monitor application invoking a confirmation method in the operating system so that the shutdown of the other processors and the processes occurring on the first processor may be confirmed. The confirmation method may be implemented in the operating system. In different embodiments, one or the other of these two approaches may be employed without using the other approach. Alternatively, in some embodiments, both approaches may be used in a complementary manner. For example, a delay may be observed, and then the security monitor application may invoke the confirmation method in the operating system. In another embodiment, the operating system may provide an atomic instruction or command for requesting suspension of other processes and/or other processors such that when instruction completes, an operation status is returned to the invoking process (i.e., the security monitor application) that the other processes and/or processors have been suspended and hence secure communications may proceed or, to the contrary, that suspension of processes and/or processors have failed and hence secure communications may not be supported at that time. These implementations may promote secure set-up of the secure communication link between the processing server and the different server.

Once the communication session has been completed, the security monitor application sends a request to the operating system to allow the other processors to resume functionality. The security monitor application also sends a request to the operating system to resume functionality of the process that was executing on the processor that the security monitor application executes on.

In an embodiment, there may be a separate secure application that performs an operation requested by the other server. The security monitor application may serve as an intermediary to the secure application and the secure application may communicate with the different server after the security monitor application has established trust with the different server. In an embodiment, the secure application may be integrated into the security monitor application. In another embodiment, the security monitor application and the secure application may be separate. The secure application may be dormant while the security monitor application checks for messages from different servers. The security monitor application may start and stop functionality of the secure application via requests sent to the operating system. When a message is received from a different server, the security monitor application may transmit the message to the secure application and the security monitor application may go dormant as the secure application conducts a communication session with the different server.

In an example of the system, an auditing company may wish to retrieve information and records from a client company so that they are able to perform a full evaluation. The auditing company may own a server that is able to utilize hardware assisted trust while the server of the client company that the auditing company wants to retrieve information from does not utilize hardware assisted trust. However, the client company may utilize the security monitor application so that it can set up a trusted environment for trusted communication. The security monitor application of the client company may wait to receive a message from the auditing company, receive the message, establish trust with the auditing company server, conduct a communication session where the information is exchanged, in trust, and after conducting the communication session, resume function as a non-trusted server.

The security monitor application provides companies that use servers without hardware assisted trust capability the ability to communicate with servers that utilize hardware assisted trust without having to replace the servers that do not utilize hardware assisted trust. The security monitor application is able to set up a trusted environment for communication where trusted and secure communication between a trusted server and a non-trusted server is established and accomplished. This function benefits a company that utilizes servers that do not have hardware assisted trust to be able to retain their servers and continue to use their servers without having to purchase or acquire servers.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete Trusted Execution Environment (TEE) may be implemented through the use of the trusted security zone hardware and software architecture. The Trusted Execution Environment is an execution environment that is parallel to the execution environment of the main mobile device operating system. The Trusted Execution Environment and/or the trusted security zone may provide a base layer of functionality and/or utilities for use of applications that may execute in the trusted security zone. For example, in an embodiment, trust tokens may be generated by the base layer of functionality and/or utilities of the Trusted Execution Environment and/or trusted security zone for use in trusted end-to-end communication links to document a continuity of trust of the communications. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1a, a system 100 is described. The system 100 comprises a security monitor processing server 102. The security monitor processing server 102 comprises a plurality of processors 104, a memory 106, and a security monitor application 108 and a plurality of processes or applications 109 stored to the memory 106. The system 100 further comprises a second server 110 and a network 112.

The security monitor processing server 102 is a server that does not utilize hardware assisted trust. Because the security monitor processing server 102 does not utilize hardware assisted trust, the server 102 may normally be unable to communicate with other servers such as the second server 110 that does utilize hardware assisted trust. This is because a server executing in trust does not generally permit an application to interwork with an untrusted remote host in view of breaching trust or exposing secrets. The security monitor application 108 is able to establish a trusted communication environment so that the security monitor processing server 102 may be able to communicate with the second server 110 that utilizes hardware assisted trust.

The security monitor application 108 may establish trust by suspending functionality of all processors of the plurality of processors 104 except for one processor 104 via an operating system of the security monitor processing server 102. The security monitor application 108 may also suspend functionality of all other applications 109 that are executing on the one processor 104 via the operating system of the security monitor processing server 102. With all functionality except for itself suspended, the security monitor processing server 102 may be able to communicate in trust when it receives messages from servers like the second server 110. For example, other applications, that could be malware or infected with malware cannot spy on operations, capture data present on internal server communication buses, screen scrape data, and other operations. The security monitor application 108 may execute on any one of the plurality of processors 104. In an embodiment, there may be at least four processors, eight processors, sixteen processors, twenty-four processors or another number of processors in the plurality of processors 104.

The security monitor processing server 102 and the second server 110 may be communicatively coupled via the network 112. The network 112 may be a private communication network, a public communication network, or a combination thereof. While one security monitor processing server 102 and one second server 110, are illustrated in FIG. 1a, it should be understood that the system 100 may comprise any number of security monitor processing servers 102 and second servers 110.

In an embodiment, the security monitor application 108 is executed by a first processor 104 of the plurality of processors 104. The security monitor application 108 may execute on any processor of the plurality of processors 104. The security monitor application 108 checks for a message from the second server 110 that requests establishment of a secure communication link between the second server 110 and the security monitor processing server 102. The message is directed to the security monitor application 108 by the second server 110 via the network 112. The security monitor application 108 may check for the message from the second server 110 at several predetermined periods of time that may comprise every second, every ten seconds, every thirty seconds, every minute, or another predetermined period of time. In an embodiment, the second server 110 may send a security token or another means of verification such as a personal identification number (PIN) or a passcode to the security monitor application 108 to verify that the second server 110 is a trusted server that security monitor application 108 may communicate with. In an embodiment, the processor 104 that executes the security monitor application 108 may schedule the security monitor application 108 and one or more apps 109 to execute in a time sharing method. Examples of time sharing methods may comprise round robin scheduling, priority based scheduling, or another form of scheduling. The security monitor application 108 checks for messages from the different server 110 when it is executed or in an active state.

Responsive to finding the message from the second server 110, the security monitor application 108 sends a request to the operating system of the security monitor processing server 102 to suspend functionality of the other processors 104 of the plurality of processors 104. Also in response to finding the message from the second server 110, the security monitor application 108 sends a request to the operating system of the security monitor processing server 102 to suspend functionality of other applications 109 that are occurring on the processor 104 that the security monitor application 108 will utilize to communicate with the second server 110. The two messages sent by the security monitor application 108 to the operating system to suspend functionality of the plurality of processors may be sent in one message. By doing this, the security monitor application 108 is able to establish an environment for trusted communication between the security monitor application 108 and the second server 110 where other parties that are outside the system 100 may not be able to see what is being communicated between the security monitor application 108 and the second server 110. In an embodiment, the communication session between the security monitor application 108 and the second server 110 may take place at predetermined intermittent time lengths. These predetermined intermittent time lengths may comprise a second, five seconds, ten seconds, thirty seconds, or another predetermined length of time. This may promote efficiency if the security monitor processing server 102 has multiple requests from other severs and could multitask and address the other requests including the current request. In an embodiment, the security monitor application 108 may do functional processing other than just communicating with the different server 110. The security monitor application 108 may perform functions such as writing data, reading data, perform transactions, perform requested operations, appending information to profiles of employees or clients, and other processes.

In an embodiment, there may be a conflict of security when the security monitor application 108 requests the suspension of the other processors 104 and processes occurring on the security monitor processing server 102. The conflict may arise from how the security monitor processing application 108 is able to determine, validate, or be made aware of that the process of suspending the other processors 104 and processes on the active processor 104 has occurred. There may be several ways the security monitor application 108 may accomplish this. One implementation may involve the security monitor application 108 delaying itself from taking action for a pre-defined period of time so that the operating system may have time to suspend the other processors 104 and the processes that are occurring on the active processor 104. Another implementation may involve the security monitor application 108 invoking a confirmation method in the operating system so that the shutdown of the other processors 104 and the processes occurring on the active processor 104 may be confirmed. The confirmation method may be pre-determined by the operating system. These two implementations may be performed in a mutually exclusive method where one implementation may be performed without the other implementation being performed. In an embodiment, both implementations may be performed. Another implementation may comprise the application 108 instructing the operating system to send a confirmation message that details the status of the shutdown of the processors 104 and the processes occurring on the active processor 104. These implementations may promote secure set-up of the secure communication link between the processing server 102 and the different/second server 110.

When the communication session has concluded between the security monitor application 108 and the second server 110, the security monitor application 108 sends a request to the operating system to allow the other processors of the plurality of processors 104 to resume functionality. The security monitor application 108 also sends another request to the operating system to resume execution of suspended applications 109 that are executing on the first processor 104. The two messages sent at the conclusion of the communication session by the security monitor application 108 to the operating system may be sent in one message.

In an example of the system 100, the second server 110 may be used by an auditing company, which may wish to retrieve information and records from a client company that uses the security monitor processing server 102 with the security monitor application 108. The client company may utilize the security monitor application 108 to communicate in trust with the second server 110 of the auditing company. The second server 110 may send a message to initiate communication to the security monitor application 108. A security token, PIN, and/or passcode may be sent with the message from the second server 110. The security monitor application 108 may receive the message from the second server 110, and validate the message and therefore the second server 110 for trusted communication using the security token.

With the second server 110 validated for trusted communication, the security monitor application 108 sends a message to the operating system of the security monitor processing server 102 to suspend functionality of all processors 104 of the plurality of processors 104 except for the processor 104 that the security monitor application 108 is executing on. The security monitor application also sends a message to the operating system to suspend functionality of other applications 109 that are executing on the processor 104 that the security monitor application 108 is executing on. In an embodiment, the messages to the operating system may be sent as one message. By suspending functionality of the other processors 104 and the applications 109 that are occurring on the remaining active processor 104, the security monitor application 108 has established an environment for trusted communication between the security monitor processing server 102 of the client company and the second server of the auditing company.

With a trusted environment established, the security monitor application 108 engages in a communication session or other forms of processing with the second server 110. During the communication session, the information that the auditing company wants from the client company is exchanged. Because all other processors 104 and applications 109 are suspended, the communication session is done in trust where no parties outside the system 100 are able to see what information is exchanged. After completion of the communication session, the security monitor application 108 sends a message to the operating system of the security monitor processing server 102 to resume functionality of the other processors 104 and the applications 109 that were previously executing on the processor 104 that the security monitor application 108 is executing on. With the other processors 104 and applications 109 on the processor 104 that the security monitor application is executing on released from suspension, the security monitor processing server 102 returns to a state of non-trust.

Figure 1B:
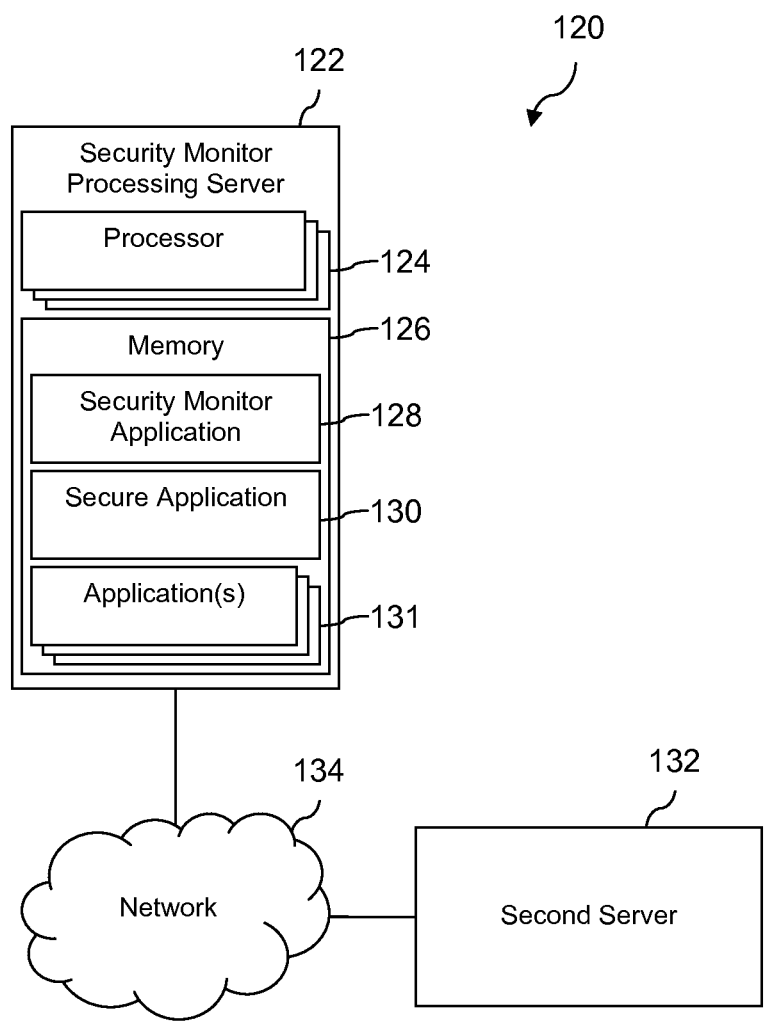
FIG. 1B is a block diagram of a system according to an embodiment of the disclosure.

In FIG. 1b, a communication system 120 is described. The system 120 comprises a security monitor processing server 122. The security monitor processing server 122 further comprises a plurality of processors 124, and a memory 126. The memory 126 further comprises a security monitor application 128, a secure application 130, and a plurality of processes or applications 131. The system 120 further comprises a second server 132 and a network 134. The security monitor processing server 122 is a server that does not utilize hardware assisted trust. The server 122 may not be able to normally to communicate in trust with other servers such as the second server 132 which does utilize hardware assisted trust. While the second server 132 does utilize hardware assisted trust it may be able to communicate out of trust with other servers such as the server 122, but it may not communicate or perform other forms of processing requests in trust unless the other servers such as the server 122 is able to do so in trust. The security monitor application 128 in conjunction with the secure application 130 may provide an environment for the security monitor processing server 122 to communicate in trust with the second server 132. The security monitor application 128 may intake requests for communication or processing from the second server 132. The security monitor application 128 may check to see if there is a message for communication from the second server 132 at several predetermined periods of time which may comprise every second, every ten seconds, every 30 seconds, every minute, or another period of time. The message may be from the second server 132 and request the establishment of a secure communication link between the second server 132 and the security monitor processing server 122. The message may be directed to the security monitor application 128. The security monitor application 128 may receive a security token, a personal identification number (PIN) or another form of verification from the second server 132 so that it may validate the server for communication with the security monitor processing server 122. In an embodiment, the secure application 130 may be dormant while the security monitor application 128 checks for messages from the second server 132.

When the security monitor application 128 receives and validates the request for communication from the second server 132, the security monitor application 128 may send a request to an operating system of the security monitor processing server 122 to suspend execution of functionality of the plurality of processors 124 except for one processor 124 that the secure application 130 may execute on. The security monitor application 128 may also send a request to the operating system to suspend a process or applications 131 that are executing on the processor 124 that did not have its functionality suspended. With the other processors of the plurality of processors 124 suspended and any applications 131 that are executing on the processor 124 that is still functional suspended, the security monitor application 128 provides an environment for secure or trusted communication with the second server 132. With a trusted communication environment established, the security monitor application 128 may transmit the request for communication to the secure application 130. The security monitor application 128 may send a message to the operating system to launch or invoke the secure application 130 as the secure application 130 may not execute until it is launched or invoked by the operating system. The secure application 130 may remain dormant while the security monitor application 128 is functioning.

In an embodiment, the operating system may enter a secure state where only the security monitor application 128 and/or the secure application 130 execute, and only the security monitor application 128 may be able to initiate an exit from the secure state. Said in other words, the operating system may provide a privileged operation available only to the security monitor application 128 that the security monitor application 128 may invoke to put the operating system in the secure state. In the secure state, the operating system does not allow other applications 109 or other processors 104 (other than the processor 104 that executes the security monitor application 128) to invoke operating system commands. Additionally, in the secure state, the security monitor application 128 may have access to powerful commands that allow it to command the operating system to suspend processing of other processors 104 and discontinue or suspend processing of other applications 109 and further to resume processing of other processors 104 and resume processing of other applications 109.

In an embodiment, the integrity of trust in the server 102 when operating in the restricted, secure operation mode (this may also be referred to as a quasi-trusted operation mode in some contexts) described herein is contingent on the integrity of the operating system and the integrity of the security monitor application 108. If the operating system and the security monitor application 108 have not been hacked or corrupted, security of the data and the communication with the second server 100 can be deemed trusted.

After doing this, the security monitor application 128 may go dormant so that the secure application 130 may execute a communication session or perform actions without the threat of another party outside the system 120 seeing the exchange. In an embodiment, the secure application 130 may be integrated into the security monitor application 128. In another embodiment, the secure application 130 may receive messages from the second server 132 and transmit the message to the security monitor application 128 for validation and then engage in the communication session or other forms of processing with the second server 132 after trust has been established.

When the communication session or other form of processing has ended, the secure application 130 may send a message to security monitor application 128 that it has finished communicating with the second server 132. The security monitor application 128 may stop the secure application 130 by sending a request to the operating system to stop the secure application 130. The secure application 130 may not work again until it is re-invoked by the operating system. The security monitor application 128 may then send a message to the operating system of the security monitor processing server 122 to release the suspended processors 124 to resume functionality, and another message to resume execution of the other applications 131 that were suspended on the processor 124 that the secure application 130 executes on. In an embodiment, the secure application 130 may send the message to the operating system to resume execution of the suspended processors 124 and the suspended applications 131 on the processor 124 that the secure application 130 executes on. With functionality of the processors 124 resumed, the security monitor processing server 122 goes back to a non-trusted state.

Figure 2:
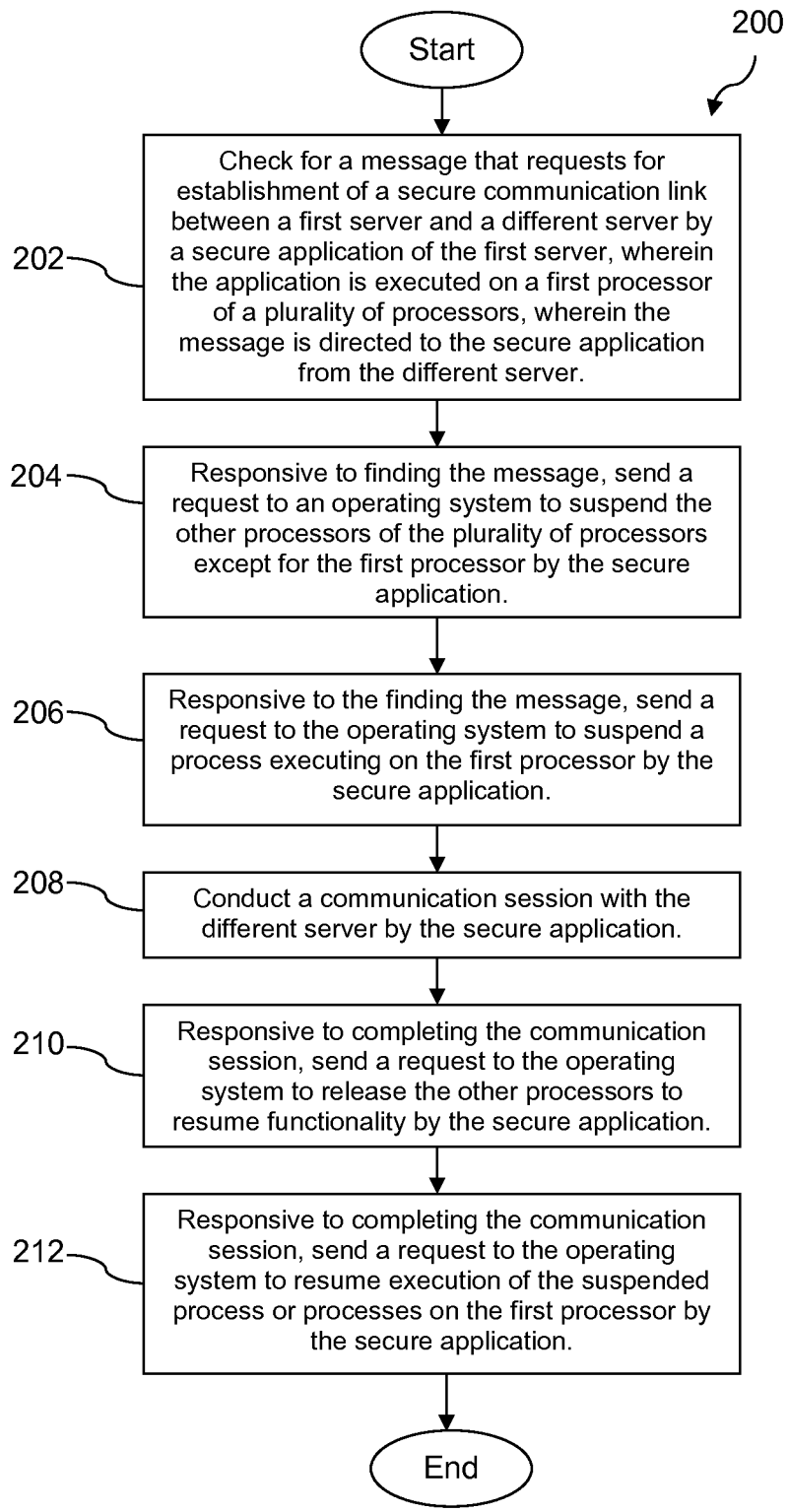
FIG. 2 is a flow chart of a method according to an embodiment of the disclosure.

In FIG. 2, a method 200 is described. At block 202, a secure application of a first server checks for a message from a different server that requests for establishment of a secure communication link between the different server and the first server, wherein the application is executed on a first processor of a plurality of processors, wherein the message is directed to the secure application from the different server. At block 204, responsive to finding the message, the secure application sends a request to an operating system to suspend the other processors of the plurality of processors except for the first processor. At block 206, responsive to finding the message, the secure application sends a request to the operating system to suspend a process executing on the first processor. In some cases, a plurality of other processes may be executing and the request may specify suspending all of these other processes. At block 208, the secure application conducts a communication session with the different server. At block 210, the secure application, responsive to completing the communication session, sends a request to the operating system to release the other processors to resume functionality. At block 212, the secure application, responsive to completing the communication session, sends a request to the operating system to resume execution of the suspended process or processes on the first processor.

Figure 3A:
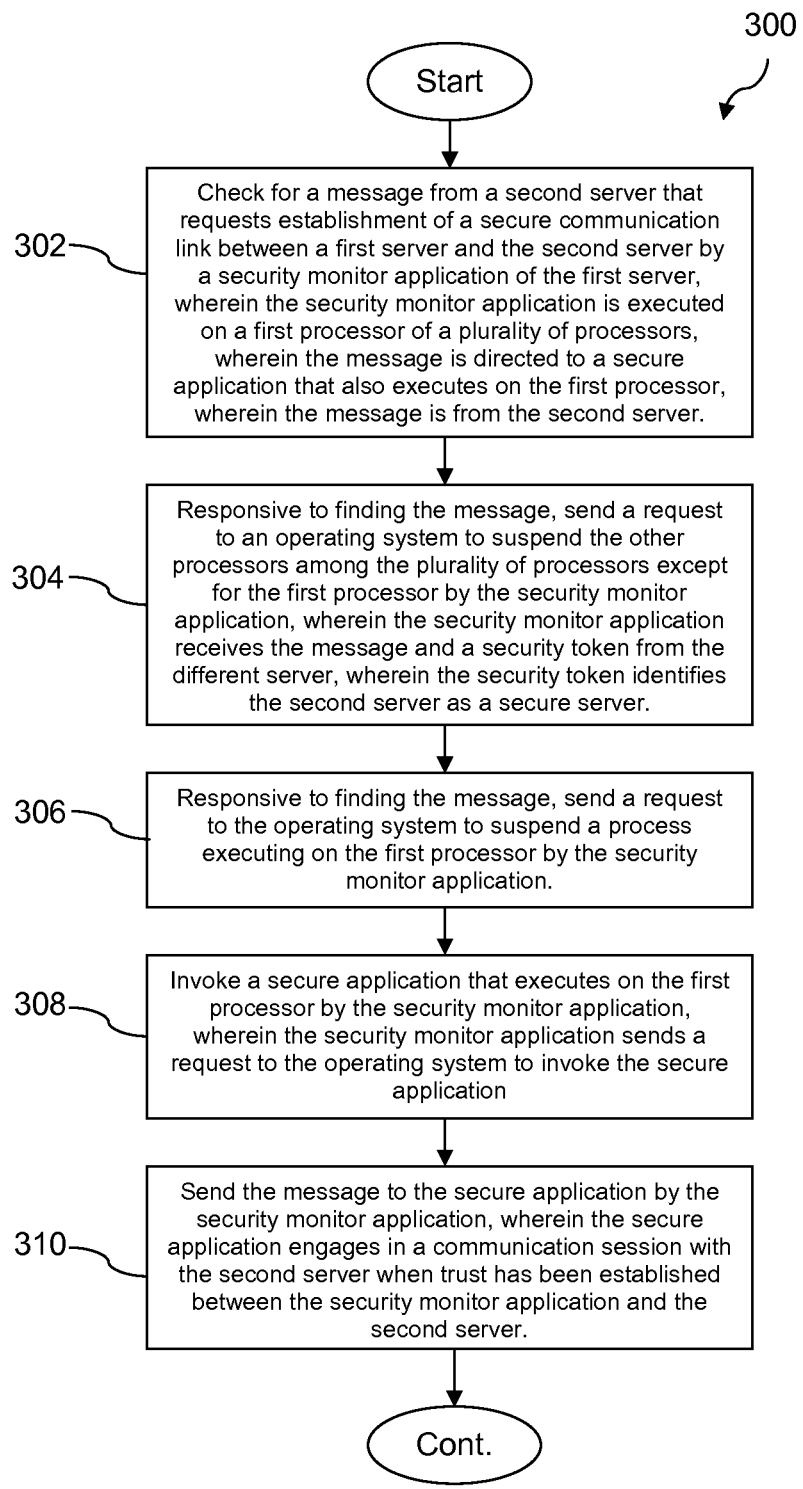
FIG. 3A and FIG. 3B are a flow chart of a method according to an embodiment of the disclosure.
Figure 3B:
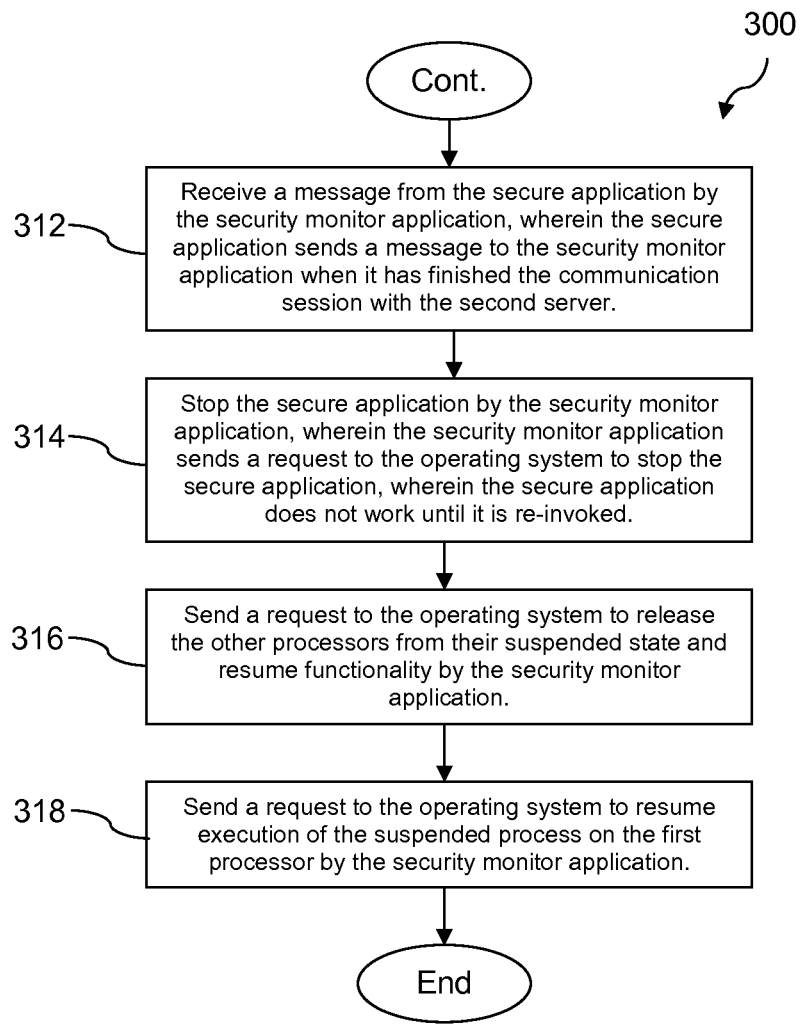

In FIGS. 3A and 3B, a method 300 is described. At block 302, the security monitor application of a first server checks for a message from a second server that requests establishment of a secure communication link between the second server and the first server, wherein the security monitor application is executed on a first processor of a plurality of processors, wherein the message is directed to a secure application that also executes on the first processor. At block 304, the security monitor application sends a request to an operating system executing on the first server to suspend the other processors among the plurality of processors except for the first processor, wherein the security monitor application receives the message and a security token from the different server, wherein the security token identifies the second server as a secure server. At block 306, the security monitor application, responsive to finding the message, sends a request to the operating system to suspend a process executing on the first processor. At block 308, the security monitor application invokes a secure application that executes on the first processor, wherein the security monitor application sends a request to the operating system to invoke the secure application. At block 310, the security monitor application sends the message to the secure application, wherein the secure application engages in a communication session or other forms of processing such as writing data to a data store, editing data to a data store, performing transactions, performing services on behalf of or at the request of the second server when trust has been established between the security monitor application and the second server. The secure application may engage in a communication session with the second server, but it may also perform or execute other forms of processing such as writing or editing data, searching for data, and other forms of processing. At block 312, the security monitor application receives a message from the secure application, wherein the secure application sends a message to the security monitor application when it has finished the communication session with the second server. At block 314, the security monitor application stops the secure application, wherein the security monitor application sends a request to the operating system to stop the secure application, wherein the secure application does not work until it is re-invoked. At block 316, the security monitor application sends a request to the operating system to release the other processors from their suspended state and resume functionality. At block 318, the security monitor application sends a request to the operating system to resume execution of the suspended process on the first processor.

Figure 4:
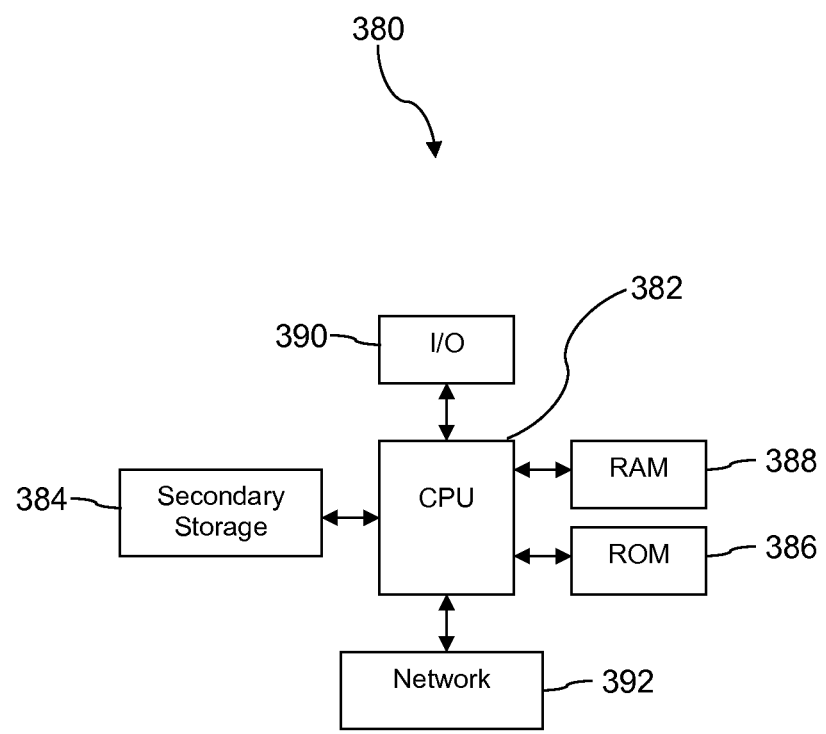
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method of establishing hardware assisted trust to a communication server that does not utilize hardware assisted trust, comprising:

checking, by a secure application of a first server, for a message that requests for establishment of a secure communication link between the first server and a different server, wherein the secure application is executed on a first processor of a plurality of processors of the first server, and wherein the message is directed from the different server to the secure application of the first server;

finding, by the secure application, the message that requests establishment of the secure communication link;

responsive to finding the message, sending, by the secure application, a request to an operating system to suspend each of the plurality of processors except for the first processor;

responsive to finding the message, sending, by the secure application, a request to the operating system to suspend a process that is executing on the first processor;

conducting, by the secure application, a communication session with the different server;

responsive to conducting the communication session, sending, by the secure application, a request to the operating system to release each of the plurality of processors that were suspended and to resume functionality; and responsive to conducting the communication session, sending, by the secure application, a request to the operating system to resume execution of the process that was suspended on the first processor.

2. The method of claim 1, wherein the communication session between the secure application and the different server takes place at intermittent time lengths.

3. The method of claim 2, wherein the intermittent time lengths of the execution of the communication session are a second, five seconds, ten seconds, and thirty seconds.

4. The method of claim 1, wherein the secure application checks for messages from the different server every second, ten seconds, thirty seconds, and every minute.

5. The method of claim 1, wherein there are at least four processors in the plurality of processors.

6. The method of claim 1, wherein the secure application executes on any processor of the plurality of processors.

7. The method of claim 1, wherein the different server sends a security token, a personal identification number (PIN), or a passcode so that it is validated for communication with the secure application.

8. A method of establishing trust between a first communication server without hardware assisted trust and a second communication server with hardware assisted trust, comprising:

checking, by a security monitor application of a first server, for a message from a second server that requests establishment of a secure communication link between the first server and the second server, wherein the security monitor application is executed on a first processor of a plurality of processors on the first server, wherein the message is directed to a secure application that also executes on the first processor of the first server, and wherein the message is from the second server;

finding, by the security monitor application, the message that requests establishment of the secure communication link;

responsive to finding the message, sending, by the security monitor application, a request to an operating system to suspend each of the plurality of processors except for the first processor, wherein the security monitor application receives the message and a security token from the second server, and wherein the security token identifies the second server as a secure server that is trusted;

responsive to finding the message, sending, by the security monitor application, a request to the operating system to suspend a process that is executing on the first processor;

invoking, by the security monitor application sending a request to the operating system, a secure application that executes on the first processor;

sending, by the security monitor application, the message to the secure application;

engaging, by the secure application, in a communication session with the second server in response to the second server being identified as a secure server that is trusted based on the security token received by the security monitor application;

receiving, by the security monitor application, a message from the secure application that indicates to the security monitor application the communication session with the second server has finished;

stopping, by the security monitor application, the secure application from executing on the first processor, wherein the security monitor application sends a request to the operating system to stop execution of the secure application, and wherein the secure application becomes dormant in response to the request to stop execution until re-invoked;

sending, by the security monitor application, a request to the operating system to release each of the plurality of processors that were suspended and to resume functionality; and sending, by the security monitor application, a request to the operating system to resume execution of the process that was suspended on the first processor.

9. The method of claim 8, wherein the security monitor application becomes dormant while the secure application communicates directly with the second server.

10. The method of claim 8, wherein the security monitor application acts as an intermediary between the secure application and the second server during the communication session.

11. The method of claim 8, wherein the security monitor application checks for a request for communication from the second server every second, every ten seconds, every thirty seconds, and every minute.

12. The method of claim 8, wherein the second server sends a security token, personal identification number (PIN), or passcode to the security monitor application so that the security monitor application can validate the second server.

13. The method of claim 8, wherein the security monitor application is able to send the content of the two messages sent at the end of the communication session in one message.

14. A server, comprising;
a plurality of processors,
a non-transitory memory, and
a security monitor application stored in the non-transitory memory, that when executed by a first processor of the plurality of processors, checks for a message from a different server, wherein the message requests establishment of a secure communication link between the different server and the security monitor application, finds the message that requests establishment of the secure communication link between the different server and the security monitor application, responsive to finding the message, sends a request to an operating system executing on the server to suspend functionality of each of the plurality of processors except for the first processor, responsive to finding the message, sends a request to the operating system to suspend a process that is executing on the first processor, conducts a communication session with the different server, responsive to conducting the communication session, sends a request to the operating system to allow each of the plurality of processors that were suspended to resume functionality, and responsive to conducting the communication session, sends a request to the operating system to resume execution of the process that was suspended on the first processor.

15. The server of claim 14, wherein the security monitor application provides a trusted environment for trusted communication.

16. The server of claim 14, wherein the operating system enters a secure state where only the operating system and the security monitor application executes.

17. The server of claim 16, wherein only the security monitor application may initiate the operating system's exit from the secure state.

18. The server of claim 14, wherein the security monitor application checks for messages at predetermined intervals of time that include every second, every ten seconds, every 30 seconds, and every minute.

19. The server of claim 14, wherein there are at least four processors in the plurality of processors.

20. The server of claim 14, wherein the security monitor application executes on any one of the plurality of processors.

* * * * *